US008896545B2

(12) United States Patent
Powell

(10) Patent No.: US 8,896,545 B2
(45) Date of Patent: Nov. 25, 2014

(54) ANGULARLY-SELECTIVE SENSOR-IN-PIXEL IMAGE DETECTION

(75) Inventor: Karlton Powell, Lake Stevens, WA (US)

(73) Assignee: Microsoft Corporation, Redmond, WA (US)

(*) Notice: Subject to any disclaimer, the term of this patent is extended or adjusted under 35 U.S.C. 154(b) by 874 days.

(21) Appl. No.: 12/625,291

(22) Filed: Nov. 24, 2009

(65) Prior Publication Data
US 2011/0122071 A1 May 26, 2011

(51) Int. Cl.
*G06F 3/041* (2006.01)
*G06F 3/042* (2006.01)

(52) U.S. Cl.
CPC .............. *G06F 3/0412* (2013.01); *G06F 3/041* (2013.01); *G06F 3/0425* (2013.01)
USPC ........ 345/173; 345/207; 250/578.1; 250/330; 250/339.11; 250/339.14; 250/341.8; 250/342; 257/227

(58) Field of Classification Search
USPC .......... 345/207, 173; 250/578.1, 330, 339.11, 250/339.14, 341.8, 342; 257/227
See application file for complete search history.

(56) References Cited

U.S. PATENT DOCUMENTS

| | | | | |
|---|---|---|---|---|
| 4,484,179 | A * | 11/1984 | Kasday | ........................ 345/176 |
| 5,182,599 | A | 1/1993 | Kinoshita | |
| 5,760,403 | A | 6/1998 | Elabd | |
| 6,255,676 | B1 | 7/2001 | Steinle | |
| 7,465,914 | B2 * | 12/2008 | Eliasson et al. | ............... 250/221 |
| 7,538,913 | B2 | 5/2009 | Kuo | |
| 8,102,378 | B2 * | 1/2012 | Chung et al. | .................. 345/173 |
| 2006/0227120 | A1 * | 10/2006 | Eikman | ......................... 345/175 |
| 2007/0152985 | A1 * | 7/2007 | Ostergaard et al. | ........... 345/176 |
| 2008/0029691 | A1 * | 2/2008 | Han | .............................. 250/224 |

(Continued)

OTHER PUBLICATIONS

Ducharme, Alfred D., "Microlens Diffusers for Efficient Laser Speckle Generation", Retrieved at <<http://www.opticsinfobase.org/viewmedia.cfm?uri=oe-15-22-14573&seq=0>>, Oct. 29, 2007, vol. 15, No. 22 / Optics Express, pp. 14573-14579.

(Continued)

*Primary Examiner* — Jason Olson
*Assistant Examiner* — Linh N Hoffner
(74) *Attorney, Agent, or Firm* — Jeremy Snodgrass; Judy Yee; Micky Minhas

(57) ABSTRACT

A display system configured for multi-touch input is provided. The display system comprises a display surface, a local light source to illuminate the display surface with infrared light, and an image-producing display panel. The image-producing display panel comprises a plurality of image sensor pixels positioned within a sensor layer of the image-producing display panel. The image-producing display panel further comprises an angularly-selective layer positioned between the display surface and the sensor layer, wherein the angularly-selective layer is configured to transmit light having a first range of incidence angles with the surface normal of the angularly-selective layer to a first sensor pixel of sensor layer, and to reflect light having a second range of incidence angles from a second sensor pixel of the sensor layer, where the second range is greater than the first range of incidence angles with respect to a surface normal of the sensor layer.

20 Claims, 10 Drawing Sheets

(56) References Cited

U.S. PATENT DOCUMENTS

2009/0039288 A1     2/2009   Kulpinski
2009/0141000 A1     6/2009   Krishnan et al.
2009/0146992 A1*    6/2009   Fukunaga et al. ............ 345/214
2010/0149113 A1*    6/2010   Hansson ....................... 345/173
2010/0302185 A1*   12/2010   Han et al. ..................... 345/173
2010/0302196 A1*   12/2010   Han et al. ..................... 345/173

OTHER PUBLICATIONS

Gardner, Dr. Richard, "Microlens Screen Systems for Rear Projection TV Applications", Retrieved at <<http://www.brightviewtechnologies.com/downloads/giga-whitepaper-final.pdf>>, Sep. 17, 2009, pp. 5.

* cited by examiner

ANGULARLY-SELECTIVE
SENSOR-IN-PIXEL IMAGE DETECTION

BACKGROUND

Touch-sensitive display systems include a display screen and a touch sensor configured to recognize a touch of an object on a surface of the display screen. In some touch-sensitive display systems, the touch sensor may be a vision-based system comprising a sensor-in-pixel device. Sensor-in-pixel devices include an image sensor at each pixel location on the display screen. The resulting array of image sensors is configured to capture an image of the surface of the display screen. The captured image is processed by the touch-sensitive display system to provide touch detection of objects touching the surface (or, in some cases, hovering over the surface) at that pixel location.

Some touch-sensitive display systems are horizontally-oriented. Horizontally-oriented touch-sensitive display systems may be subject to forces not encountered by vertically-oriented display systems. For example, a horizontally-oriented touch-sensitive display system may be subject to forces from objects, such as drinking glasses, placed on the screen. The touch-sensitive display system may also be subject to forceful touches to the screen, and to forces arising from the weight of the screen itself.

SUMMARY

Accordingly, various embodiments are disclosed herein that relate to the detection of touch via a sensor-in-pixel display system, otherwise known as in-cell detection. For example, one disclosed embodiment provides a display system comprising a display surface, a local light source to illuminate the display surface with one or more wavelengths of infrared light, and an image-producing display panel. The image-producing display panel comprises a plurality of sensor pixels positioned within a sensor layer. The image-producing display panel further comprises an angularly-selective layer positioned between the display surface and the sensor layer, wherein the angularly-selective layer is configured to transmit light having a first range of incidence angles with the surface normal of the angularly-selective layer and to reflect light having a second range of incidence angles that is greater than the first range of incidence angles with respect to a surface normal of the sensor layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
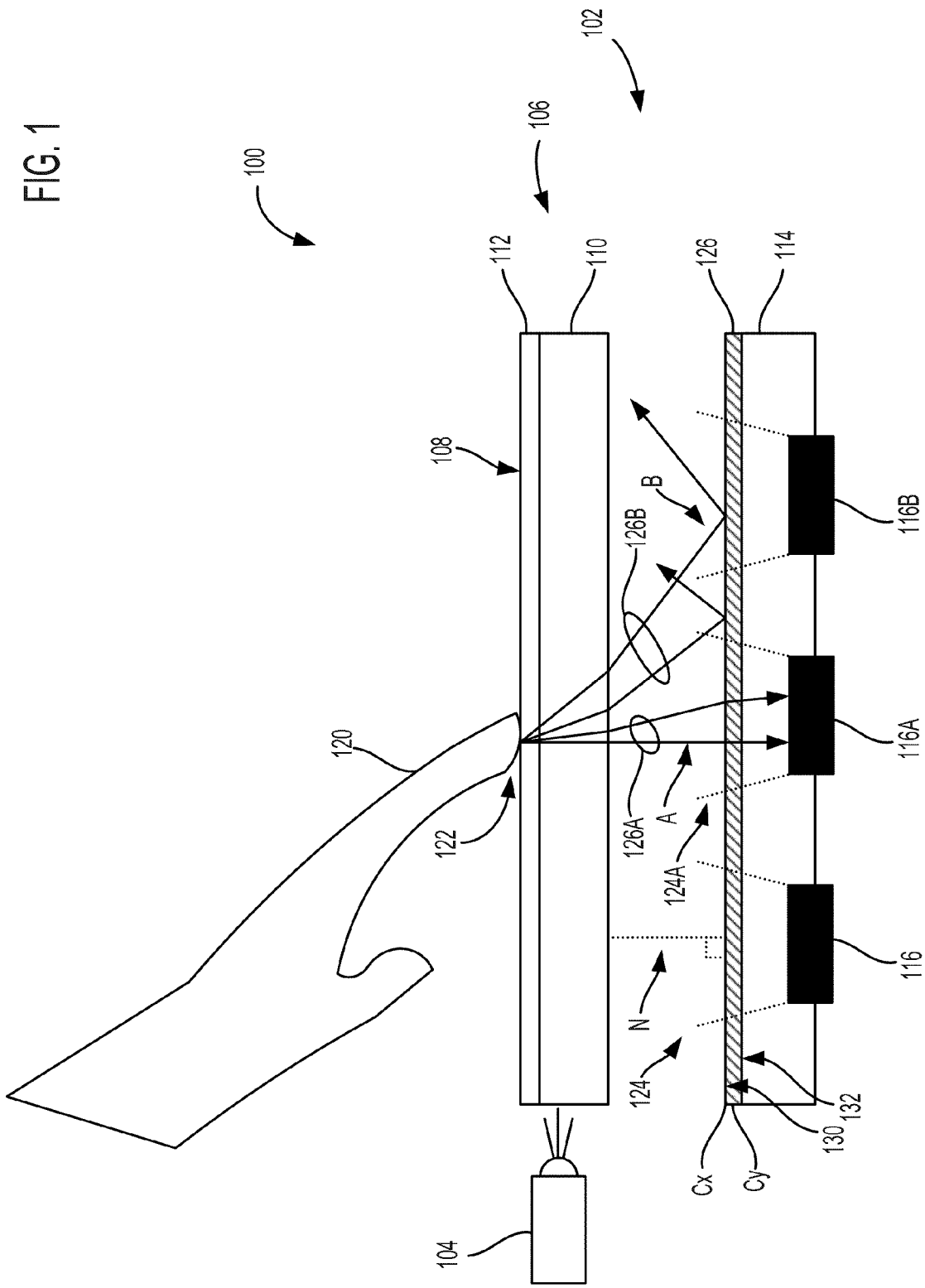
FIG. 1 is a schematic view of a first embodiment of a display system comprising a sensor-in-pixel panel.

FIG. 1 illustrates an embodiment of a display system 100 comprising a sensor-in-pixel system for vision-based detection of touch inputs, including multi-touch inputs, for a computing device. Display system 100 includes an image-producing display panel 102 and a local light source 104. Image-producing display panel 102 includes a display screen 106 having a display surface 108 for displaying images produced by image-producing display panel 102. Display screen 106 includes a rigid mechanical strength layer 110 configured to resist bowing of display screen 106 caused by gravity, forces from touch inputs on display surface 108, etc. In some embodiments, rigid mechanical strength layer 110 is transparent, and is further configured to transmit locally-originated infrared light reflected from a touch at display surface 108 to an angularly-selective layer 126, which may transmit or reflect the light, as described in more detail below. In FIG. 1, rigid mechanical strength layer 110 is separated from angularly-selective layer 126 by an air gap, but other embodiments may not have such a separation, or may be separated by any other suitable material(s) or medium. Rigid mechanical strength layer 110 may further include a transparent durability layer 112 to resist contact or scratch damage to display screen 106 caused by touch inputs on display surface 108.

Image-producing display panel 102 also includes an image-producing mechanism for producing images for display. For example, image-producing display panel 102 may comprise a liquid crystal display (LCD) mechanism, as well as a backlight to provide light to the LCD mechanism. However, it will be understood that any other suitable image-producing mechanism may be employed.

Local light source 104 is configured to illuminate display surface 108 with one or more wavelengths of infrared light. For example, in FIG. 1, local light source 104 is shown as a light emitting diode directing infrared light into an edge of display screen 106. Light emitted by local light source 104 may leak out of display surface 108, for example, via diffusing elements (not shown) formed in or otherwise arranged on display surface 108. A portion of the leaked infrared light may be reflected by an object touching the display surface. For example, in FIG. 1, a digit 120 of a user's hand is shown forming a touch input 122 with display surface 108. The infrared light reflected by touch input 122 may be used by a touch sensor to detect the touch input to the display surface.

Touch input detection is accomplished by incorporating an array of image sensors into the image-producing display panel in a sensor-in-pixel arrangement. This is shown in FIG. 1 as a sensor layer 114 including a plurality of sensor pixels 116, where each of the sensor pixels 116 is positioned in each display panel pixel. It will be appreciated that, in some embodiments, sensor pixels 116 may be located according to other suitable arrangements. For example, sensor pixels 116 may be located in every other display panel pixel, in discrete subpixel locations within each display panel pixel, etc. As a more specific example, in some embodiments, sensor pixels may be located in a red subpixel portion of a red-green-blue (RGB) pixel. Sensor pixels 116 are configured to capture images of touch inputs to display surface 108. Each of the sensor pixels 116 has a field of view 124 associated therewith. For example, in FIG. 1, digit 120 of a user's hand is shown forming a touch input 122 with display surface 108 above sensor pixel 116A and within a field of view 124A of sensor pixel 116A. Thus, an image of touch input 122 will be captured by sensor pixels 116A and others that are disposed beneath the touch input, causing display system 100 to detect a touch to the display surface. It will be noted that the relative sizes of the features shown in FIG. 1 are greatly exaggerated for the purpose of illustration, and that a touch input by a single finger may cover a relatively large number of sensor pixels 116.

Because reflection of local light from objects on display surface 108 may be diffuse, local light reflected by the touch input may also be detected by other sensor pixels than those immediately below the touch. This may negatively impact the modulation transfer function of the touch detection system. Therefore, to help address this issue, image-producing display panel 102 also includes angularly-selective layer 126 positioned between display surface 108 and sensor layer 114. Angularly-selective layer 126 is configured to transmit light having a first range of incidence angles 126A with surface normal N of angularly-selective layer 126 to a first sensor pixel 116A of sensor layer 114. Angularly-selective layer 126 is further configured to reflect light having a second range of incidence angles 126B from a second sensor pixel 116B of sensor layer 114, where the second range of incidence angles 126B is greater than the first range of incidence angles 126A with respect to a surface normal N of sensor layer 114. It will be understood that a transition angle between reflective and transmissive angle ranges may vary based upon the wavelength of incident light, and that the angularly-selective layer 126 may be tailored to achieve a desired transition at a desired wavelength (e.g., at a wavelength, such as an infrared wavelength, used for vision-based touch detection).

In this way, light reflected and scattered into high angles of incidence with respect to a surface normal by a touch input or an object at the display surface, or further scattered into high angles of incidence by one or more optical components between the display surface and the angularly-selective layer, is reflected away from the sensor layer. In one scenario, Lambertian-like scattering of light from a paper or finger object at the display surface may cause light scatter having a high angle of incidence. For example, in FIG. 1, light ray A, having an incidence angle within the first range of incidence angles 126A is transmitted by angularly-selective layer 126 to sensor pixel 116A. However, light ray B, having an incidence angle within the second range of incidence angles 126B is reflected by angularly-selective layer 126 and is thus directed away from sensor pixel 116B.

Figure 2:
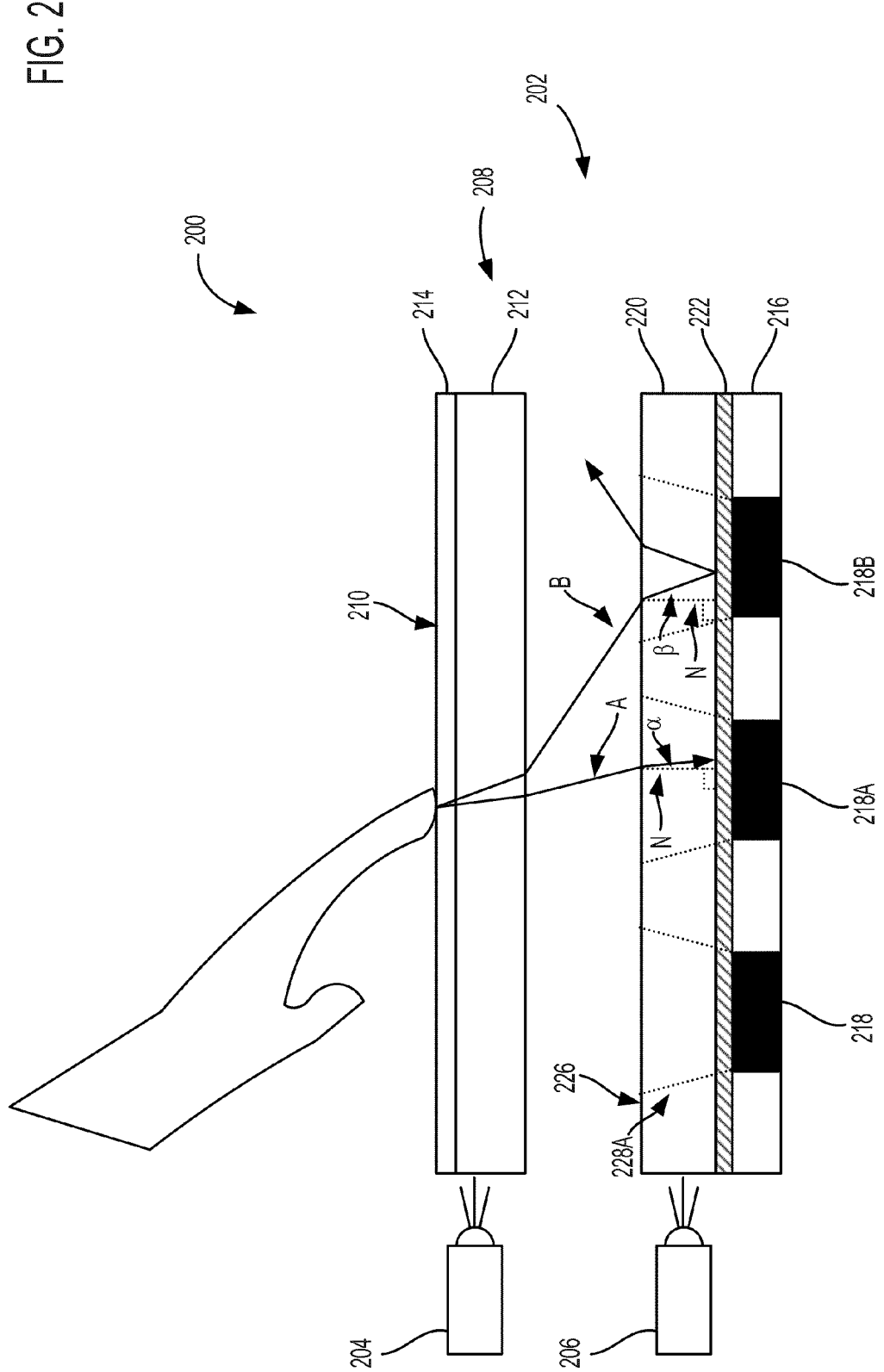
FIG. 2 is a schematic view of a second embodiment of a display system comprising a sensor-in-pixel panel.

It will be understood that the angularly-selective layer may be located in any suitable position between the display surface and the sensor pixel. For example, FIG. 2 shows an embodiment of a display system 200, including an image-producing display panel 202, a local light source 204, and a visible light source 206. Display system 200 also includes a display screen 208 having a display surface 210 for displaying images produced by image-producing display panel 202. Display screen 208 includes a rigid mechanical strength layer 212 and a transparent durability layer 214. Image-producing display panel 202 also includes a sensor layer 216 for sensing touch inputs to display surface 210. Sensor layer 216 includes a plurality of sensor pixels 218 positioned within sensor layer 216.

FIG. 2 also shows a light guide 220 positioned above sensor layer 216. Light guide 220 is configured to receive light from visible light source 206 and emit the visible light in the direction of display screen 208 to provide a visible backlight for display surface 210. Visible light source 206 is shown in FIG. 2 as a visible light emitting diode, but it will be appreciated that any suitable visible light source may be employed.

In FIG. 2, angularly-selective layer 222 is shown positioned between light guide 220 and sensor layer 216, and is configured to transmit light ray A to a first sensor pixel 218A of sensor layer 216 having a field of view 228A that is determined by the reflectance characteristics of the angularly-selective layer 222. An incidence angle α is shown between light ray A and a surface normal N of angularly-selective layer 222 that lies within a range of acceptance angles defined by field of view 228A of sensor pixel 218A. Any light ray having an incidence angle within the range of acceptance angles will be detected by sensor pixel 218A. Light rays having incidence angles outside of the range of acceptance angles, and thus outside of field of view 228A, will be reflected from sensor pixel 218A. In the example of FIG. 2, infrared light ray B has an incidence angle β, which is greater than incidence angle α, and is therefore outside of the range of angles accepted by sensor pixel 218A. Thus, light ray B will not be accepted by sensor pixel 218A. Further, to avoid detection of light ray B at sensor pixel 218B, angularly-selective layer 222 reflects infrared light ray B from a second sensor pixel 218B.

Figure 3:
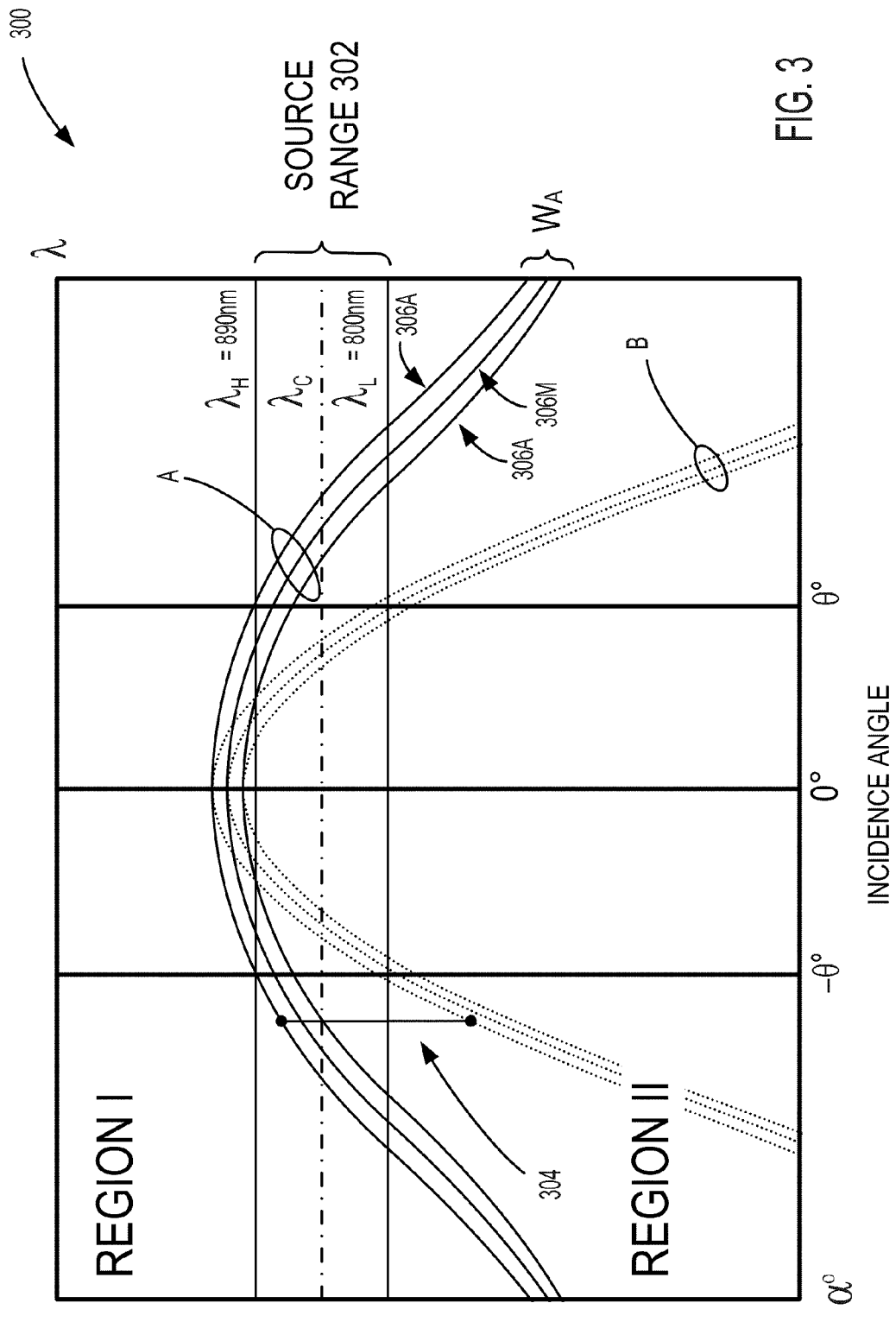
FIG. 3 is graphical view of a relationship between reflectivity, wavelength and incident light angle for an embodiment of an angularly-selective layer.

The function of the angularly-selective layer may be understood by examining FIG. 3, which shows a relationship 300 between an incidence angle with respect to a surface normal of an embodiment of an angularly-selective layer (such as a surface normal N of angularly-selective layer 126 of FIG. 1) and a reflectivity of the angularly-selective layer 126 as a function of wavelength. FIG. 3 illustrates a shift in the response curve of the angularly-selective layer 126 from high transmission at normal incidence to high reflection at higher angles of incidence, which may be due, in part, to a variation in the refractive index of the angularly-selective layer 126 along the thickness or along the surface normal of the layer, discussed in more detail below.

The angularly-selective layer modeled in FIG. 3 comprises between 40 and 100 layers of index variation in a dichroic coating on a polymer film substrate, such as polyethylene terephthalate (PET). The dichroic coating may comprise any suitable materials, including but not limited to, silicon dioxide, tantalum oxide, etc. Further examples are listed below.

As explained above, the light emitted by the local light source may be emitted as a range of wavelengths. This range is represented as a source range 302 in FIG. 3. Source range 302 includes a median wavelength $\lambda_C$ bracketed by a lower bound $\lambda_L$ and an upper bound $\lambda_H$. A tie line 304 shows the spectral shift between a curve family A, which represents the spectral response of the angularly-selective layer as a function of incidence angle to local light traveling in air, and a curve family B, which represents the spectral response of the angularly selective layer as a function of incidence angle to local light traveling in the medium of the angularly-selective layer. Each curve family represents a transition region from a reflective region to a transmissive region for the modeled material, having a transition width W defined by boundaries which bracket a midpoint. For example, curve family A has a transition width $W_A$ defined by boundaries 306A and midpoint 306M.

A region I of FIG. 3, located above curve family A, represents a region of a high reflectance for light encountering the angularly-selective layer in air. A region II, located below curve family A, represents a region of a high transmission for light encountering the angularly-selective layer in air. Thus, light of wavelength $\lambda_H$ will be transmitted through the angularly-selective layer for all incidence angles between $-\theta$ and $+\theta$, and will be reflected from the angularly-selective layer for all other incidence angles. In some embodiments, region I may have a reflectance of more than 85% and region II may have a transmission of at least 90%. In other embodiments, regions I and II may have other suitable transmission and reflectance characteristics.

The transition width $W_A$ of curve family A in FIG. 3 represents a transition width of the angularly-selective layer. As transition width $W_A$ varies, a transition between a highly-reflective angularly-selective layer and a highly-transmissive angularly-selective layer becomes more or less abrupt. This transition is shown in more detail in FIG. 4, which depicts a graph 400 showing a relationship between wavelength and reflectance of an embodiment of the type of angularly-selective film modeled in FIG. 3. A first reflectance curve 402 represents a reflectance of light having an incidence angle of approximately 10 degrees with respect to a surface normal of the angularly-selective layer (such as surface normal N of angularly-selective layer 126 of FIG. 1). Reflectance curve 402 exhibits a lower reflectivity for light having wavelengths within source range 302, transitioning to a higher reflectivity for wavelengths greater than $\lambda_H$. A slope of reflectance curve 402 varies according to transition width W; thus, the slope of reflectance curve 402 decreases as the transition width W increases.

Figure 4:
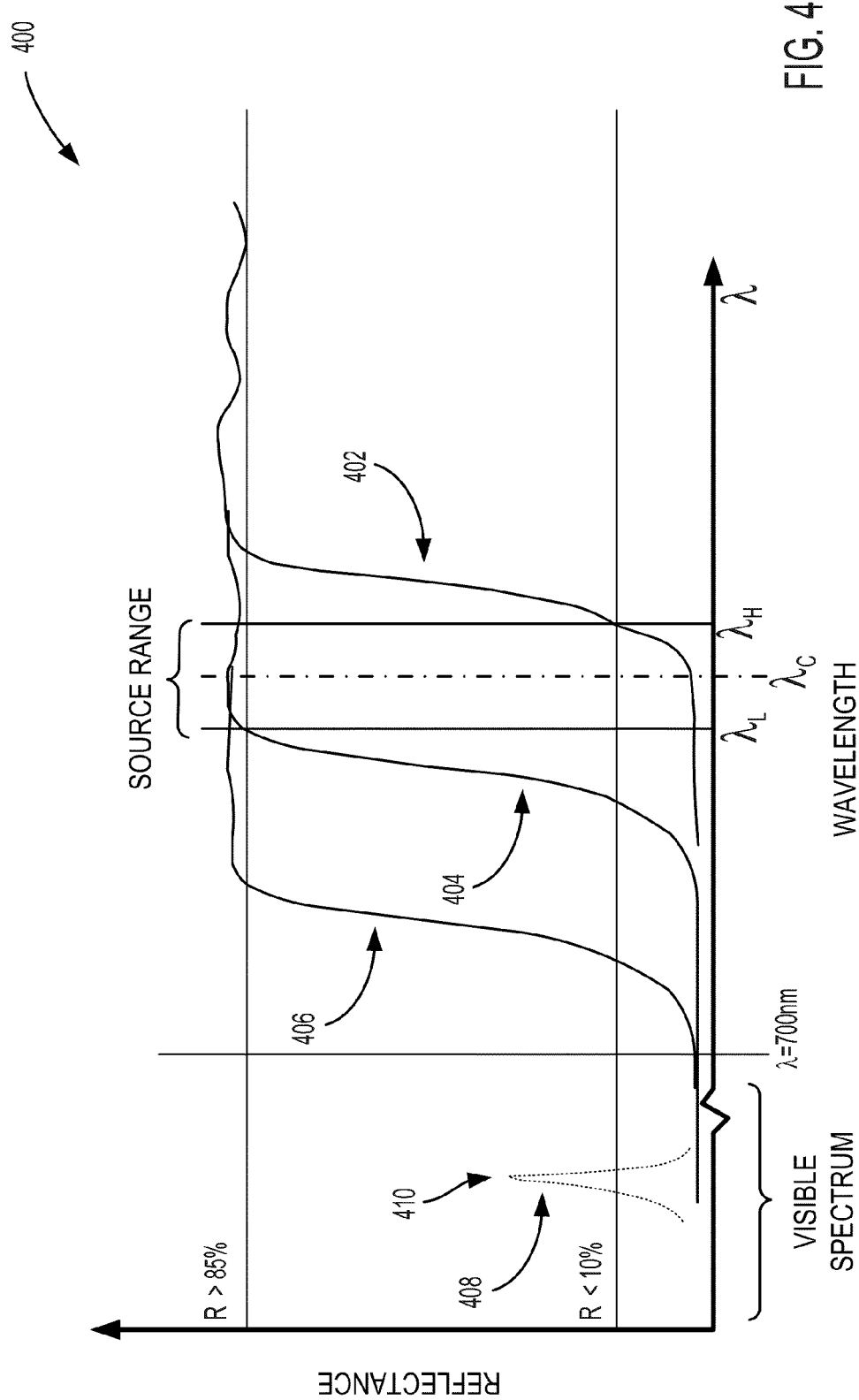
FIG. 4 is a graphical view of a relationship between a reflectance and a wavelength of light for an angularly-selective layer.

FIG. 4 also shows a second reflectance curve 404 representing a reflectance of infrared light having an incidence angle of approximately 57 degrees with respect to the surface normal of the angularly-selective layer. Reflectance curve 404 has a higher reflectivity for light within source range 302, transitioning to a lower reflectivity for wavelengths lower than $\lambda_L$. Thus, it will be appreciated that light within source range 302 may be transmitted or reflected according to the incidence angle of the light with the angularly-selective layer. In some embodiments the angularly-selective layer may be configured to transmit at least 90% of light incident to the angularly-selective layer within the source range and having an incidence angle less than or equal to 10 degrees with respect to the surface normal of the angularly-selective layer as measured in air. In other embodiments, the angularly-selective layer may be configured to transmit any other suitable amount of light in this range of incident angles. Additionally or alternatively, in some embodiments the angularly-selective layer may be configured to transmit no more than 15% of light incident to the angularly-selective layer within the source range and having an incidence angle of greater than 57 degrees with respect to the surface normal of the angularly-selective layer as measured in air.

In some embodiments, a visible light source may be included within the display system to provide visible light backlighting for the display surface. As will be described in more detail below with reference to FIGS. 7-9, the visible light source may be located behind the angularly-selective layer. The visible light source may further be configured to emit an approximately Lambertian distribution of visible light. In order to avoid reducing a transmission efficiency of the visible light to the display surface, the angularly-selective layer may be configured to transmit more than 85% of visible light having an incidence angle of less than 80 degrees with respect to a surface normal of the angularly-selective layer (such as surface normal N of angularly-selective layer 126 of FIG. 1). For example, in FIG. 4, a third reflectance curve 406, representing light having an incidence angle of approximately 80 degrees with respect to the surface normal of the angularly-selective layer, has a reflectance of less than 10% in a region of a visible spectrum, corresponding to a transmittance of more than 90%. In some embodiments, the visible light may be emitted as one or more wavelengths between 400 and 700 nm.

The angularly-selective layer 126 may have any suitable structure. For example, in some embodiments, the angularly-selective layer 126 may comprise a single film layer with a sinusoidal composition gradient across its thickness, such as a Rugate film, or may comprise a stack of film layers, such as a dichroic film. The constituent materials may include a material having a higher refractive index, such as titanium dioxide (n~2.4) and zinc sulfide (n~2.32), and a material having a lower refractive index, such as magnesium fluoride (n~1.38) and silicon dioxide (n~1.49). Examples of materials that may be used in such a film include, but are not limited to, silica, various metal oxides including tantalum, titanium, chromium, aluminum, zirconium, and magnesium.

As described above, angularly-selective layer 126 may comprise a Rugate layer, wherein the dielectric materials that comprise the dielectric layer have a periodic concentration gradient that changes smoothly between a first composition $C_x$ and a second composition $C_y$ of angularly-selective layer 126. Such a film may be formed, for example, by controlling deposition rates of a plurality of precursor sources during a thin film deposition process such that the relative rates of deposition of each layer vary over time, such as in the case of a Rugate layer.

In other embodiments, the angularly-selective film may include a multi-layer dichroic film. Such a dielectric film comprises a plurality of layers of materials with alternating indices of refraction. Examples of suitable materials for such a film are given above. However, some multi-layer dichroic films may produce spectral artifacts caused by shifting and/or reflecting one or more visible wavelengths of ambient and/or projected light toward the display screen. Such spectral artifacts may degrade a viewing experience. For example, a reflectance curve 408 of FIG. 4 shows an artifact 410, located in a green range of the visible spectrum, which may cause green ambient light to be reflected toward a viewer. In some embodiments, the angularly-selective layer may include a plurality of layers, at least a portion of which may have uneven periodicity in order to reduce the transmission efficiency of such artifacts.

One approach to address this issue, at least in part, is to pattern the multi-layer dichroic film, thus reducing an overall reflective area of the angularly-selective layer. Patterned dichroic films may be formed by any suitable process. For example, a photolithographic method may be employed to deposit a removable mask layer over a portion of the dichroic film. The unmasked portion dichroic film may be etched away by a suitable etching process. Once the mask layer is subsequently removed, the previously-masked dichroic film remains, forming the patterned layer.

Figure 5:
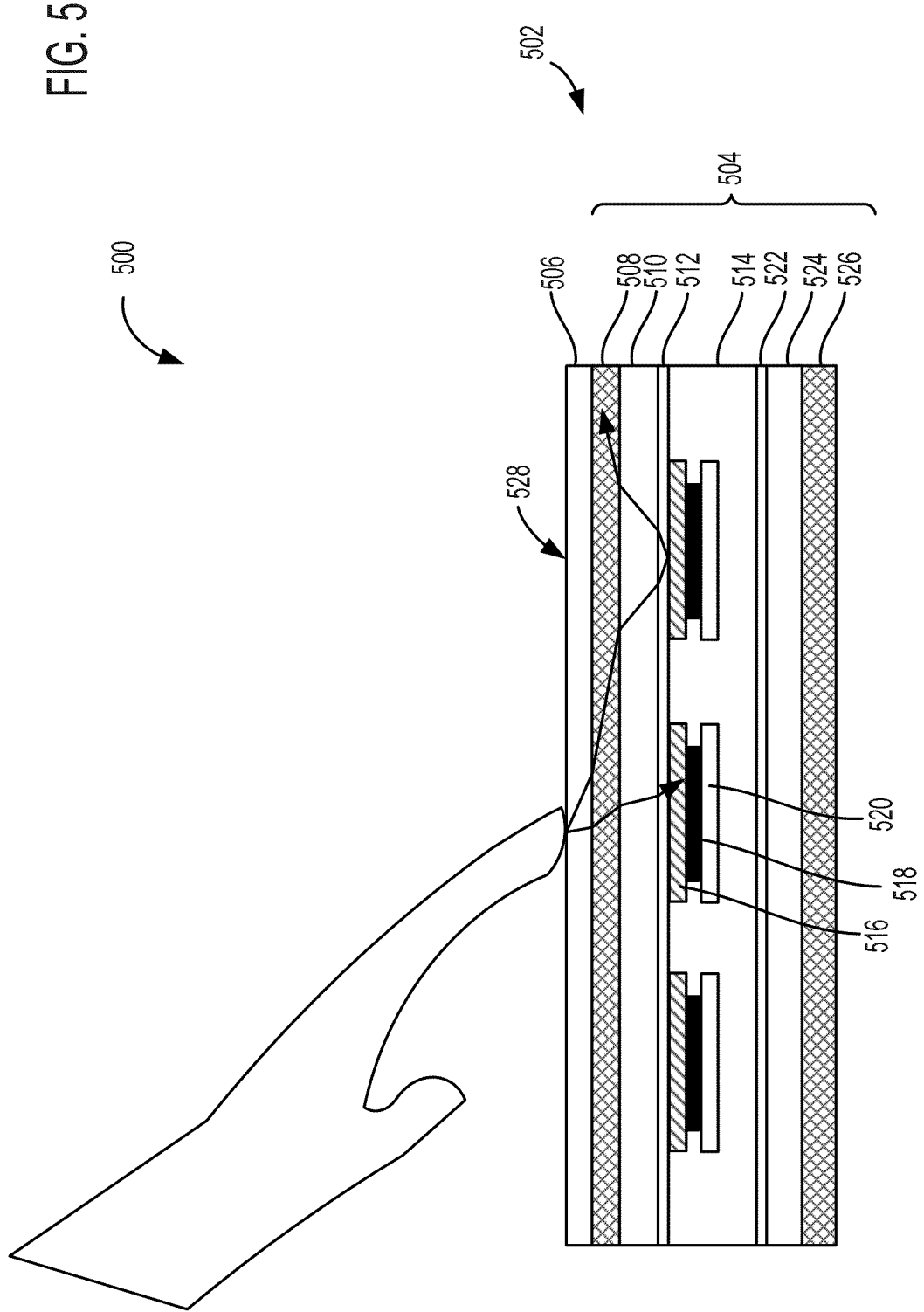
FIG. 5 is a schematic view of a third embodiment of a display system comprising a sensor-in-pixel panel.

For example, FIG. 5 schematically illustrates an embodiment of a display system 500 including an image display panel 502 and having a display surface 528. Image display panel 502 includes a liquid crystal display 504 and a durability layer 506. It will be understood that the relative sizes of depicted features may be exaggerated for the purpose of illustration.

Liquid crystal display 504 includes a first polarizer 508, a first glass substrate 510, and a trace layer 512. Trace layer 512 is configured to provide electrical interconnection for liquid crystal display 504. In some embodiments, trace layer 512 may include one or more interconnected integrated circuits. Liquid crystal display 504 also includes liquid crystal layer 514. Sensor pixels 518 are positioned within liquid crystal layer 514 below a patterned array of angularly-selective layers 516 and above light blocking layers 520. Light blocking layers 520 are configured to block display light from a backside of sensor pixels 518. Liquid crystal display 504 further comprises a second trace layer 522, a second glass substrate 524, and a second polarizer 526.

Angularly-selective layers 516 comprise a patterned array of multi-layer dichroic filters arranged to be optically aligned with corresponding array of sensor pixels 518. Angularly-selective layer 516 defines a field of view of the array of corresponding sensor pixels 518. Thus, a light reflection having an incident angle within a range of acceptance angles for the field of view of the sensor pixel will be transmitted by the angularly-selective layer optically aligned with the corresponding sensor pixel. Light reflections having incident angles outside of the range of acceptance angles of the field of view of the sensor pixel as defined by the angularly-selective layer 516 will either be reflected by angularly-selective layers above other sensor pixels or, because the light reflections do not fall within a field of view of the other sensor pixels, will miss the corresponding angularly-selective layers of the other sensor pixels.

Figure 6:
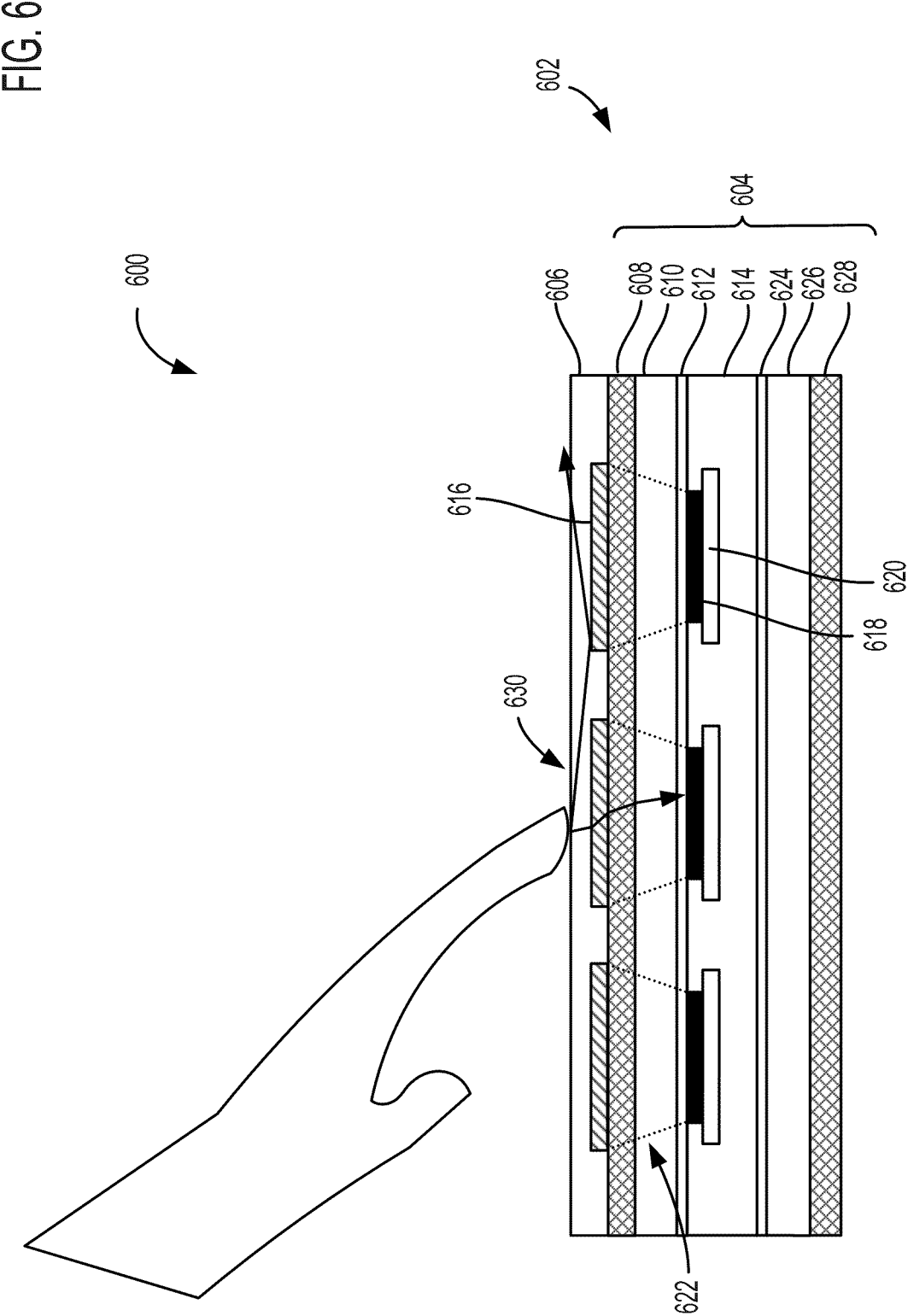
FIG. 6 is a schematic view of a fourth embodiment of a display system comprising a sensor-in-pixel panel.

In the example embodiment shown in FIG. 5, angularly-selective layers 516 are included within liquid crystal display 504. However, in some embodiments, the pattern of angularly-selective layers may be formed on an external surface of a liquid crystal display. For example, FIG. 6 shows a schematic view of an embodiment of a display system 600. Display system 600 includes an image display panel 602 and having a display surface 630. Image display panel 602 includes a liquid crystal display 604. Liquid crystal display 604 comprises a first polarization layer 608, a first glass substrate layer 610, a first trace layer 612, and a liquid crystal layer 614. Liquid crystal layer 614 comprises sensor pixels 618 and light blocking layers 620. Liquid crystal display 604 further comprises a second trace layer 624, a second glass substrate 626, and a second polarizer 628. Image display panel 602 also includes a durability layer 606. Durability layer 606 includes a patterned array of angularly-selective layers 616. Angularly-selective layers 616 are optically aligned with corresponding sensor pixels 618, and are configured to cover a corresponding field of view 622 of each of the corresponding sensor pixels 618. Thus, while the scales and sizes depicted in FIGS. 5 and 6 are exaggerated for clarity, it will be appreciated that the angularly-selective layer may be a multi-layer dichroic filter, which may be patterned and arranged to cover a field of view of a sensor pixel, or an array of sensor pixels.

Returning to FIG. 1, it will also be appreciated that local light source 104 may be configured in different ways depending on a use environment. In some embodiments, the light emitted by the local light source is emitted in a wavelength range including one or more wavelengths between 800 and 890 nm. However, it will be appreciated that any other suitable infrared wavelengths may be employed.

Figure 7:
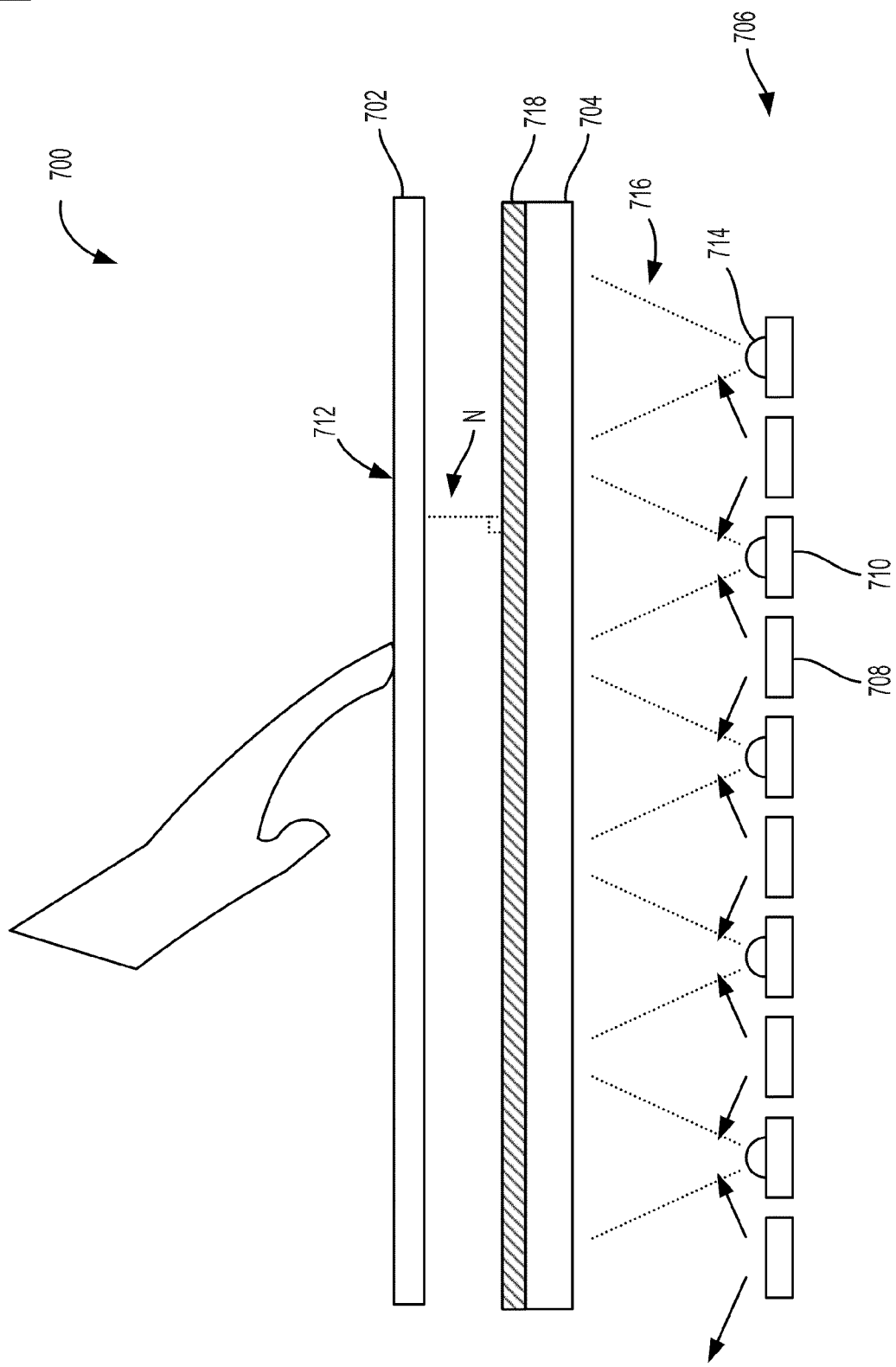
FIG. 7 is a schematic view of a fifth embodiment of a display system comprising a sensor-in-pixel panel.

Further, various different configurations for illuminating the display surface with infrared light and/or visible light may be employed. For example, in some embodiments, the local light source comprises an array of light emitting diodes configured to direct infrared light through the sensor layer to illuminate the display surface. FIG. 7 shows an embodiment of a display system 700 having a display screen 702, an image producing panel comprising a sensor layer 704, and a local light source 706 that includes an array of visible light emitting diodes 708 configured to provide visible backlighting for the image producing panel.

Local light source 706 also includes an array of infrared light emitting diodes 710 configured to direct infrared light through sensor layer 704 and illuminate a display surface 712 of display screen 702. Each of the infrared light emitting diodes 708 is shown having a light collection optic, such as a dome lens 714 to establish an aperture stop 716 for each of the corresponding infrared light emitting diodes 710. Aperture stop 716 is configured to direct infrared light with a range of angles that will be transmitted by an angularly-selective layer 718. Angularly-selective layer 718 is shown in FIG. 7 as being separated by an air gap from display screen 702, though it will be appreciated that other suitable media may exist in that space in various embodiments. Thus, the light emitted by the array of infrared light emitting diodes 710 will not be reflected by angularly-selective layer 718, improving a transmission efficiency of infrared light to display surface 712.

Figure 8:
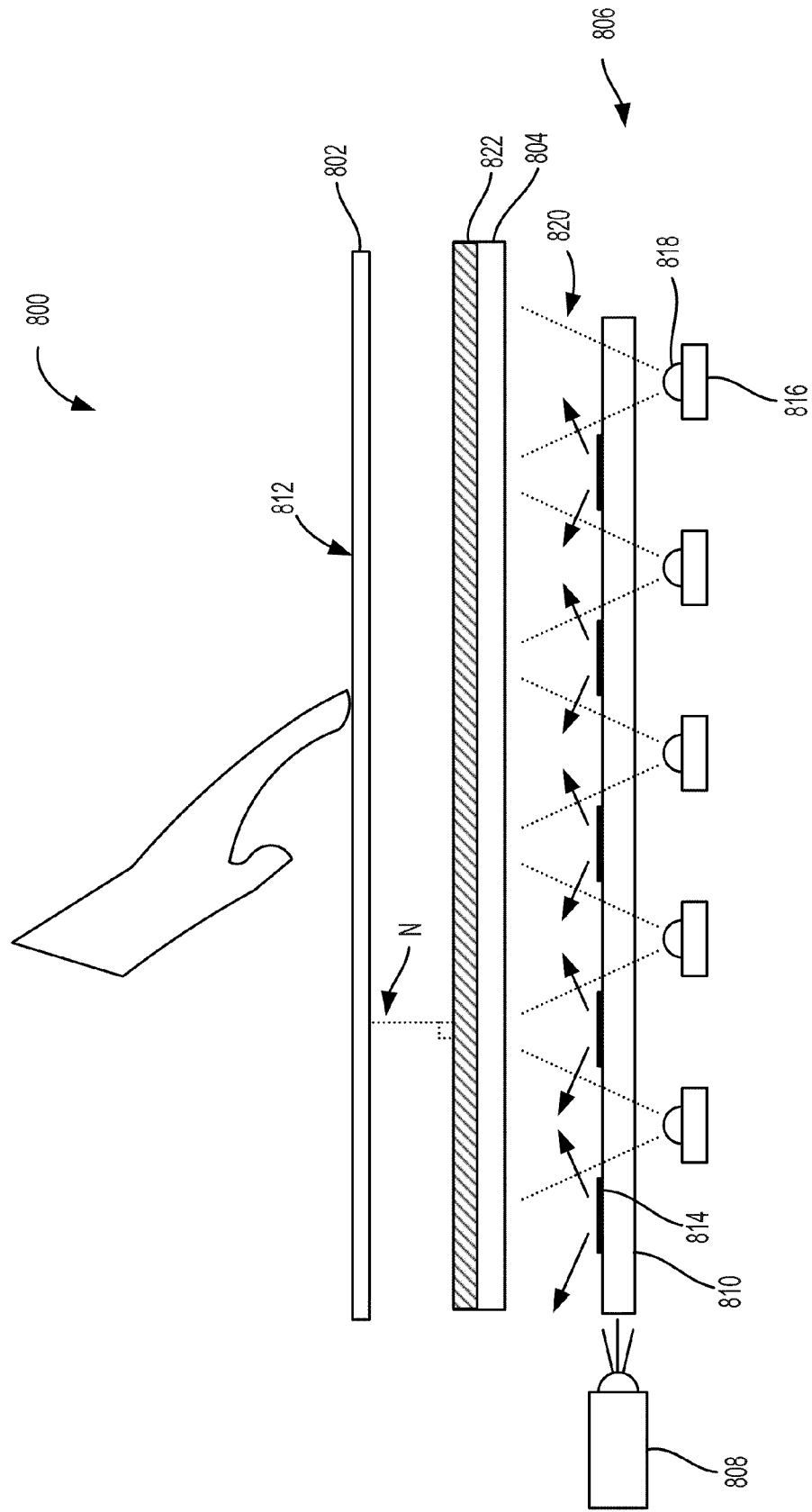
FIG. 8 is a schematic view of a sixth embodiment of a display system comprising a sensor-in-pixel panel.

In some embodiments, visible backlighting for the display is provided by an array of visible light emitting diodes configured to inject visible light into a light guide. For example, FIG. 8 shows an embodiment of a display system 800 having a display screen 802, an image display panel comprising a sensor layer 804, and a local light source 806. Local light source 806 includes a plurality of visible light emitting diodes 808 configured to inject visible light into a light guide 810. Light guide 810 is configured to allow visible light to leak toward a display surface 812 at a plurality of visible light extraction pads 814 arrayed on light guide 810.

Local light source 806 also includes an array of infrared light emitting diodes 816 configured to direct infrared light through sensor layer 804 and illuminate display surface 812. Each of the infrared light emitting diodes 816 is shown having a dome lens 818 to establish an aperture stop 820 for each of the corresponding infrared light emitting diodes 816 so that the infrared light emitted will not be reflected by an angularly-selective layer 822, which is shown positioned between display screen 802 and sensor layer 804. Angularly-selective layer 822 is shown in FIG. 8 as being separated by an air gap from display screen 802, though it will be appreciated that other suitable media may exist in that space according to the embodiment.

Figure 9:
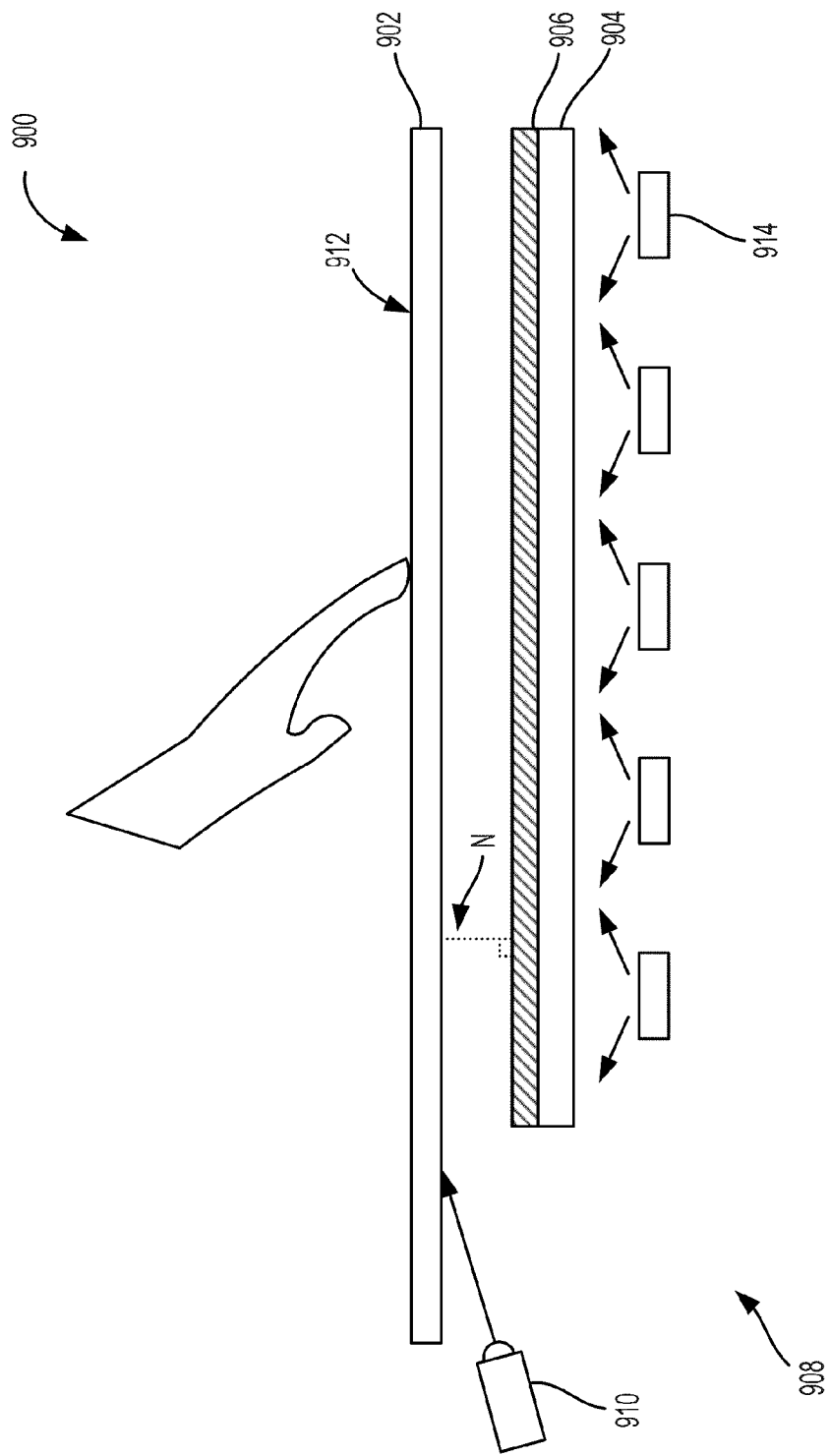
FIG. 9 schematic view of a seventh embodiment of a display system comprising a sensor-in-pixel panel.

In some embodiments, the local light source comprises an array of light emitting diodes configured to inject infrared light into a light guide located between the display surface and the sensor layer. For example, FIG. 9 illustrates an embodiment of a display system 900 having a display screen 902, an image producing display panel comprising a sensor layer 904, an angularly-selective layer 906, and a local light source 908. Angularly-selective layer 906 is shown as being separated by an air gap from display screen 902, though it will be appreciated that other suitable media may exist in that space according to the embodiment.

Local light source 908 includes a plurality of infrared light emitting diodes 910 configured to direct infrared light into display screen 902. Display screen 902 acts as a light guide, illuminating a display surface 912 of display screen 902. Also included in display system 900 is an array of visible light emitting diodes 914 configured to provide visible backlighting for display screen 902. However, it will be appreciated that, in some embodiments, a light guide may be used in combination with the visible light emitting diodes to provide visible backlighting for the display screen.

It will be understood that the sizes of the various parts depicted in FIGS. 1-9 are neither to scale nor intended to represent any size relationships among those parts, but instead are sized to clarify the arrangements and the locations of the depicted parts.

In some embodiments, the angularly-selective layer may filter visible light. For example, the angularly-selective layer may be an RGB notch filter. Additionally or alternatively, the angularly-selective layer may be used with an infrared vision system. Further, in some embodiments where the angularly-selective layer is patterned, it will be appreciated that it may be possible to filter discrete colors in some scenarios. For example, in a scenario where the light source has a spectral width of ~40 to 60 nm FWHM, it may be possible to provide RGB angular filtering using a multi-notched embodiment of the angularly-selective layer described herein where the central peak wavelength of each source is spectrally separated from the overlap point determined by the shift of the response of the angularly-selective layer with respect to incidence angle. It will further be appreciated that the angularly-selective layer described herein may, in some embodiments, be included in interspersed detector arrays having one or more of a discrete red, green, and/or blue angularly-selective layers cooperating with corresponding, discrete RGB sources. For example, in some embodiments, discrete red, green, and blue angularly-selective layers may cooperate with red, green, and blue LEDs, each LED having a limited spectral width.

Figure 10:
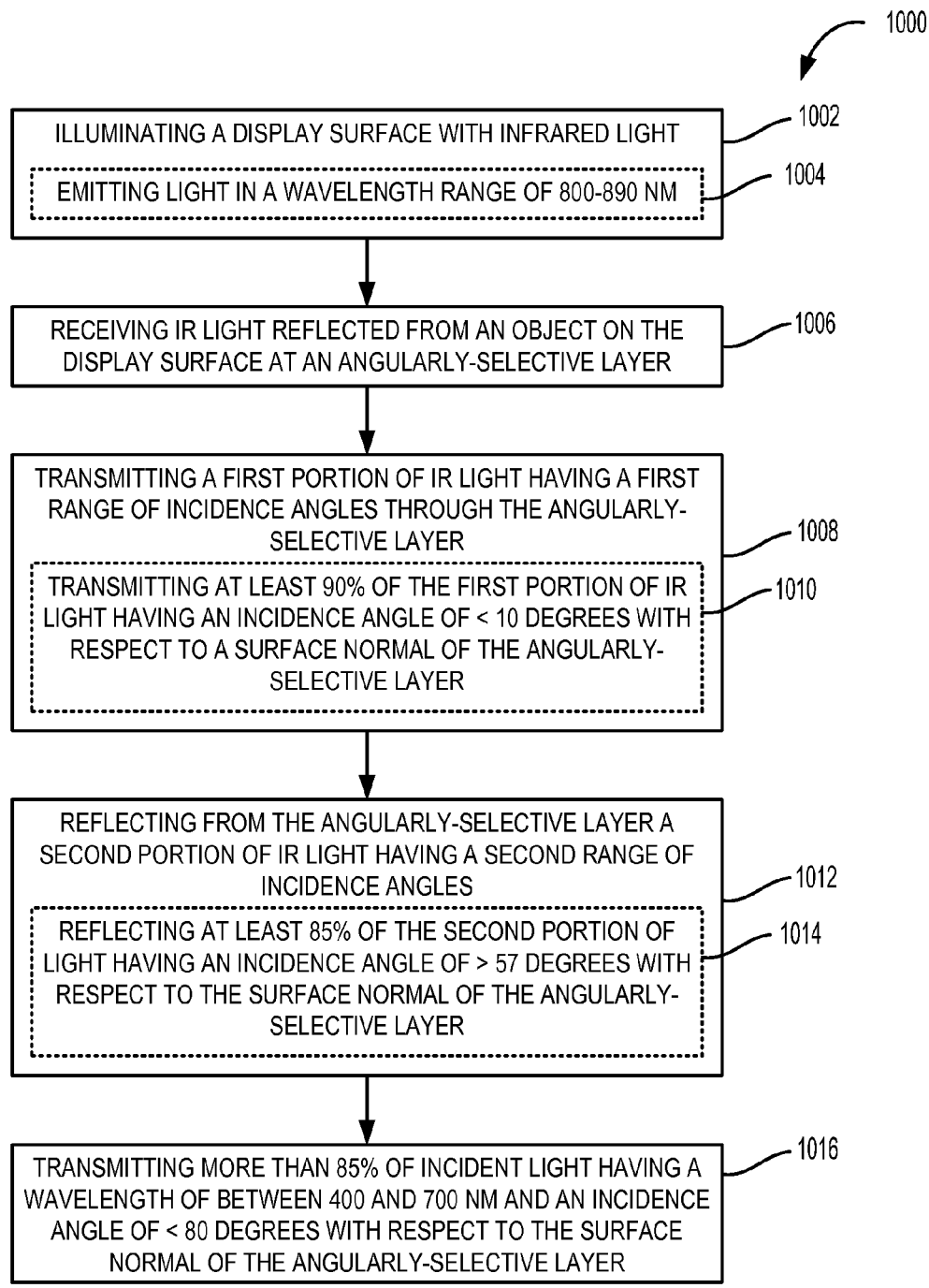
FIG. 10 is a flowchart depicting an embodiment of a method for detecting a touch on a display surface of a display system via a sensor-in-pixel panel.

FIG. 10 shows a method 1000 for capturing an image of an object touching a display surface of a display system using a sensor-in-pixel display panel that comprises a sensor layer included in an image-producing display panel, such as an LCD panel. Method 1000 may be used with the hardware described above or with any other suitable hardware. Method 1000 includes, at 1002, illuminating the display surface with infrared light from a local light source. In some embodiments, this may further include emitting light in a wavelength range including one or more wavelengths between 800 and 890 nm, as indicated at 1004. Next, at 1006, method 1000 includes receiving infrared light emitted by the local light source and reflected from the object toward a sensor layer at an angularly-selective layer positioned between the sensor layer and the display surface.

At 1008, method 1000 includes transmitting through the angularly-selective layer a first portion of the infrared light having a first range of incidence angles with respect to a surface normal of the angularly-selective layer such that the first portion of infrared light reaches a first sensor pixel of the sensor layer. This may also include transmitting at least 90% of the first portion of the infrared light having an incidence angle less than or equal to 10 degrees with respect to a surface normal of the angularly-selective layer as measured in air, as indicated at 1010.

Next, at 1012, method 1000 includes reflecting from the angularly-selective layer a second portion of the infrared light having a second range of incidence angles with respect to the surface normal of the angularly-selective layer. This may also include, at 1014, reflecting at least 85% of the second portion of the infrared light having an incidence angle of greater than 57 degrees with respect to the surface normal of the angularly-selective layer as measured in air.

Continuing to 1016, method 1000 also includes transmitting more than 85% of incidence light having a wavelength of between 400 and 700 nm and having an incidence angle of less than 80 degrees with respect to the surface normal of the angularly-selective layer as measured in air.

It will be appreciated that, in some embodiments, the angularly-selective layer used with method 1000 may comprise a film having a periodic composition gradient between a first composition and a second composition of the angularly-selective layer. For example, in one embodiment, the first composition may have a low refractive index and may smoothly transition to a second composition having a high refractive index. In some embodiments, an amplitude of refractive index variation may be modulated to enable phase matching at the first and opposing surfaces of the angularly-selective layer.

Additionally or alternatively, the angularly-selective layer used with method 1000 may also comprise a multi-layer dichroic filter patterned to have an array of angularly-selective pixel filters, wherein each angularly-selective pixel filter is optically aligned with a corresponding sensor pixel to filter light incidence within a field of view of that sensor pixel. For example, in one embodiment, the dichroic filter may comprise tens or hundreds of discrete, alternating layers of materials having high and low refractive indices. In some embodiments, the dichroic filter's layers may be modulated along the thickness of the angularly-selective layer to enable phase matching at a light input surface and at a light output surface of the angularly-selective layer.

It will be understood that the disclosed embodiments of display systems may be used to display images and accept touch inputs for any suitable computing device. For example, such computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable storage media may be provided having program instructions stored thereon, which upon execution by a computing device, cause the computing device to execute the methods described above and cause operation of the systems described above.

It will be understood that the specific configurations and/or approaches described herein for scanning collimated light are presented for the purpose of example, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A display system configured for multi-touch input, the display system comprising:
a display screen including a display surface and a reflection emission surface opposite the display surface;
a local light source to illuminate the display screen with one or more wavelengths of infrared light; and
an image-producing display panel comprising
a plurality of sensor pixels positioned within a sensor layer of the image-producing display panel, and
an angularly-selective layer positioned between the reflection emission surface and the sensor layer, the reflection emission surface configured to emit infrared light reflected from a touch at the display surface toward the angularly-selective layer, the angularly-selective layer configured to transmit a greater portion of infrared light having a first range of incidence angles with respect to a surface normal of the angularly-selective layer to a first sensor pixel of the sensor layer and to reflect a lesser portion of the infrared light having the first range of incidence angles, and to reflect a greater portion of infrared light having a second range of incidence angles in a direction away from a second sensor pixel of the sensor layer and to transmit a lesser portion of the infrared light having the second range of incidence angles, the second range of incidence angles being greater than the first range of incidence angles with respect to a surface normal of the sensor layer.

2. The display system of claim 1, further comprising a rigid, transparent mechanical strength layer configured to direct infrared light reflected from the touch at the display surface to the angularly-selective layer via the reflection emission surface.

3. The display system of claim 1, wherein the angularly-selective layer is configured to transmit more than 85% of incident light having a wavelength of between 400 and 700 nm and having an incidence angle of less than 80 degrees with respect to the surface normal of the angularly-selective layer as measured in air.

4. The display system of claim 1, wherein the infrared light emitted by the local light source is emitted in a wavelength range including one or more wavelengths between 800 and 890 nm.

5. The display system of claim 1, wherein the angularly-selective layer is configured to transmit at least 90% of light incident to the angularly-selective layer within a wavelength range output by the local light source having an incidence angle less than or equal to 10 degrees with respect to the surface normal of the angularly-selective layer as measured in air and wherein the angularly-selective layer is further configured to transmit no more than 15% of light incident to the angularly-selective layer within the wavelength range output by the local light source having an incidence angle of greater than 57 degrees with respect to the surface normal of the angularly-selective layer as measured in air.

6. The display system of claim 1, wherein the angularly-selective layer comprises a film having a periodic composition gradient between a first composition and a second composition of the angularly-selective layer.

7. The display system of claim 1, wherein the angularly-selective layer includes a multi-layer dichroic filter.

8. The display system of claim 7, wherein the multi-layer dichroic filter is patterned to have an array of angularly-selective pixel filters, wherein each angularly-selective pixel filter is optically aligned with a corresponding sensor pixel to filter light incident within a field of view for the corresponding sensor pixel.

9. The display system of claim 1, wherein the local light source comprises an array of light emitting diodes configured to direct infrared light through the sensor layer to illuminate the display surface.

10. The display system of claim 1, wherein the local light source comprises an array of light emitting diodes configured to inject infrared light into a light guide located between the display surface and the sensor layer.

11. An image-producing display panel configured for use with a multi-touch input display system, the image-producing display panel comprising:

a display surface;
a sensor layer comprising an array of sensor pixels configured to capture an image of an object touching the display surface; and
an angularly-selective layer positioned between the display surface and the sensor layer, the angularly-selective layer comprising an array of angularly-selective pixel filters, each angularly-selective pixel optically aligned with a corresponding sensor pixel to filter light incident within a field of view of that sensor pixel, each angularly-selective pixel filter being configured to transmit to a first sensor pixel incidence infrared light having an incidence angle within a first, lower range of incidence angles with respect to a surface normal of the angularly-selective layer, and to reflect from a second sensor pixel incident infrared light having an incidence angle within a second, higher range of incidence angles with respect to the surface normal of the angularly-selective layer.

12. The image-producing display panel of claim 11, where the angularly-selective layer includes a multi-layer dichroic filter.

13. The image-producing display panel of claim 11, wherein the angularly-selective layer is configured to transmit at least 90% of incident infrared light having an incidence angle less than or equal to 10 degrees with respect to the surface normal of the angularly-selective layer as measured in air and wherein the angularly-selective layer is further configured to transmit no more than 15% of incident infrared light having an incidence angle of greater than 57 degrees with respect to the surface normal as measured in air.

14. A method for capturing an image of an object touching a display surface of a display screen included in a display system using a sensor layer included in an image-producing display panel of the display system, the method comprising:
edge-illuminating the display screen with infrared light from a local light source;
receiving infrared light emitted by the local light source, reflected from the object, and transmitted through a reflection emission surface and toward an angularly-selective layer positioned between the sensor layer and the reflection emission surface;
transmitting through the angularly-selective layer a greater portion of the infrared light having a first range of incidence angles with respect to a surface normal of the angularly-selective layer such that the first portion of infrared light reaches a first sensor pixel of the sensor layer, and reflecting a lesser portion of the infrared light having the first range of incidence angles; and
reflecting from the angularly-selective layer a greater portion of the infrared light having a second range of incidence angles with respect to the surface normal of the angularly-selective layer, and transmitting a lesser portion of the infrared light having the second range of incidence angles.

15. The method of claim 14, further comprising transmitting more than 85% of incident light having a wavelength of between 400 and 700 nm and having an incidence angle of less than 80 degrees with respect to the surface normal of the angularly-selective layer as measured in air.

16. The method of claim 15, where transmitting through the angularly-selective layer the greater portion of the infrared light having the first range of incidence angles with respect to the surface normal of the angularly-selective layer such that the greater portion of infrared light reaches the first sensor pixel of the sensor layer includes transmitting at least 90% of the greater portion of the infrared light having an incidence angle less than or equal to 10 degrees with respect to the surface normal of the angularly-selective layer as measured in air.

17. The method of claim 16, where reflecting from the angularly-selective layer the greater portion of the infrared light having a second range of incidence angles with respect to the surface normal of the angularly-selective layer includes reflecting at least 85% of the greater portion of the infrared light having an incidence angle of greater than 57 degrees with respect to the surface normal of the angularly-selective layer as measured in air.

18. The method of claim 14, wherein the angularly-selective layer comprises a film having a sinusoidal composition gradient between a first composition and a second composition of the angularly-selective layer.

19. The method of claim 14, wherein the angularly-selective layer includes a multi-layer dichroic filter patterned to have an array of angularly-selective pixel filters, wherein each angularly-selective pixel filter is optically aligned with a corresponding sensor pixel to filter light incidence within a field of view of that sensor pixel.

20. The method of claim 14, wherein edge-illuminating the display screen with infrared light from the local light source includes emitting light in a wavelength range including one or more wavelengths between 800 and 890 nm.

\* \* \* \* \*